(12) United States Patent
Huston et al.

(10) Patent No.: US 7,243,136 B2
(45) Date of Patent: Jul. 10, 2007

(54) APPROACH FOR MANAGING AND PROVIDING CONTENT TO USERS

(75) Inventors: Arthur Charles Thomas Huston, Sudbury, MA (US); Matthew Dennis Haines, Fort Collins, CO (US); Freeland Knight Abbott, III, Arlington, MA (US); Adam Louis Beguelin, San Mateo, CA (US); Michael Alexander Chowla, San Carlos, CA (US)

(73) Assignee: Inktomi Corporation, Foster City, CA (US)

( * ) Notice: Subject to any disclaimer, the term of this patent is extended or adjusted under 35 U.S.C. 154(b) by 791 days.

(21) Appl. No.: 09/764,493

(22) Filed: Jan. 17, 2001

(65) Prior Publication Data

US 2002/0007402 A1   Jan. 17, 2002

Related U.S. Application Data

(60) Provisional application No. 60/176,666, filed on Jan. 18, 2000.

(51) Int. Cl.
G06F 15/16 (2006.01)

(52) U.S. Cl. .............. 709/217; 709/203; 709/213; 709/229; 707/203; 711/118

(58) Field of Classification Search ........ 709/217–219, 709/223–226, 229, 203, 232, 213–216; 715/511; 707/100, 200, 203; 711/117–118, 130, 147–148
See application file for complete search history.

(56) References Cited

U.S. PATENT DOCUMENTS

| | | | | |
|---|---|---|---|---|
| 5,611,049 A | | 3/1997 | Pitts ...................... 395/200.09 |
| 5,818,510 A | * | 10/1998 | Cobbley et al. ............ 725/139 |
| 5,864,837 A | * | 1/1999 | Maimone ...................... 707/1 |
| 5,878,218 A | * | 3/1999 | Maddalozzo et al. ....... 709/213 |
| 6,085,234 A | | 7/2000 | Pitts et al. .................. 709/217 |
| 6,112,231 A | * | 8/2000 | DeSimone et al. ......... 709/213 |
| 6,128,623 A | * | 10/2000 | Mattis et al. ............... 707/100 |
| 6,138,141 A | * | 10/2000 | DeSimone et al. ......... 709/203 |
| 6,178,461 B1 | * | 1/2001 | Chan et al. ................. 709/247 |
| 6,240,447 B1 | * | 5/2001 | Banga et al. ............... 709/217 |

(Continued)

OTHER PUBLICATIONS

Zheng Wang et al., "Prefetching in World Wide Web," Nov. 18, 1996, IEEE, XP 0010220168, pp. 28-31.

(Continued)

Primary Examiner—Bharat Barot
(74) Attorney, Agent, or Firm—Hickman Palermo Truong & Becker LLP; Edward A. Becker

(57) ABSTRACT

Content is managed and provided to users over a communications link using a differencing engine. The differencing engine is configured to selectively cause content to be refreshed in a cache. Specifically, the differencing engine is configured to detect whether a more recent version of a data item is available, and if so, delete a current version of the data item from the cache and retrieve and store in the cache the more recent version of the data item. Content is selected for refresh based upon a set of one or more selection criteria. The selection criteria may include, for example, the source of content, the size of content, the age of content, the type of content and users to which the content is being provided.

77 Claims, 5 Drawing Sheets

U.S. PATENT DOCUMENTS

| | | | |
|---|---|---|---|
| 6,256,712 B1 * | 7/2001 | Challenger et al. | 711/141 |
| 6,289,358 B1 * | 9/2001 | Mattis et al. | 707/203 |
| 6,360,366 B1 * | 3/2002 | Heath et al. | 709/203 |
| 6,366,947 B1 * | 4/2002 | Kavner | 709/203 |
| 6,377,957 B1 * | 4/2002 | Jeyaraman | 707/200 |
| 6,378,053 B1 * | 4/2002 | Lamaire et al. | 711/159 |
| 6,389,460 B1 * | 5/2002 | Stewart et al. | 709/217 |
| 6,415,280 B1 * | 7/2002 | Farber et al. | 707/2 |
| 6,618,751 B1 * | 9/2003 | Challenger et al. | 709/213 |
| 6,622,167 B1 * | 9/2003 | Keesey et al. | 709/219 |
| 6,675,214 B2 * | 1/2004 | Stewart et al. | 709/226 |
| 6,832,368 B1 * | 12/2004 | Zimowski | 717/139 |

OTHER PUBLICATIONS

Adam Dingle et al., "Web cache coherence," Computer Networks and ISDN Systems 28 (1996) 907-920, pp. 907-920.

Chengjie Liu et al., "Maintaining Strong Cache Consistency in the World-Wide Web," 1997, IEEE, pp. 12-21.

John Dilley, et al., "The Distributed Object Consistency Protocol Version 1.0", Internet Systems and Applications Laboratory, HP Laboratories Palo Alto, HPL-1999-109, Sep. 1999.

* cited by examiner

APPROACH FOR MANAGING AND PROVIDING CONTENT TO USERS

RELATED APPLICATION

This application claims priority to U.S. Provisional Patent Application No. 60/176,666 filed Jan. 18, 2000 and entitled "Content Exchange," the entire contents of which are incorporated herein for all purposes.

FIELD OF THE INVENTION

The present invention relates generally to information management, and more specifically, to an approach for managing and providing content to users.

BACKGROUND OF THE INVENTION

The worldwide packet data communications network now commonly referred to as the "Internet" has experienced extraordinary growth and acceptance. The Internet provides access to hundreds of millions of electronic documents, making it the largest single source of information in the world. As used herein, the term "electronic document" refers to any type of data or information in electronic form. Examples of electronic documents include, without limitation, text documents and web pages. In addition to providing access to vast amounts of information, the Internet provides a medium for a plethora of exciting and useful services such as electronic mail, user-to-user chat services and even the ability to conduct telephone calls, commonly referred to as "voice over IP."

Arguably, one of the most valuable uses of the Internet is the ability for users to view and download enormous amounts of "content" from the Internet. In the context of the Internet, the term "content" broadly refers to almost any type of information or data. Common examples of Internet content include, without limitation, information about products and services offered by merchants, news and financial data. On the Internet, content is commonly provided to users in the form of web pages that are downloaded to users' personal computers and viewed using a web browser.

FIG. 1 is a block diagram of a conventional arrangement 100 for providing Internet content to a user. A user 102 uses a tool such as a Web browser to connect to an access provider 104, sometimes referred to as an Internet Service Provider (ISP), via a communications link 106. An example of access provider 104 is the Internet dial-up service provided by America Online. Communications link 106 may be any medium that allows data to be exchanged between user 102 and access provider 104. Examples of communications link 106 include, without limitation, a dial up connection, a cable modem connection, a Digital Subscriber Line (DSL) connection and a wireless connection.

Access provider 104 is communicatively coupled to the Internet 108 via a communications link 110. Communications link 110 may be any medium that allows data to be exchanged between access provider 104 and Internet 108 and is typically a broadband connection that allows for relatively large amounts of data to be exchanged between access provider 104 and Internet 108, since access provider 104 may provide Internet access to a large number of users.

Content providers 112, 114, 116 are communicatively coupled to Internet 108 via communications links 118, 120, 122, respectively, and provide content to user 102. Typically, user 102 views web pages hosted by access provider 104 and requests particular information by selecting icons or links to information that user 102 desires to see.

Two conventional approaches for providing content from content providers 112, 114, 116 to user 102 are the "retrieval approach" and the "cache approach." According to the retrieval approach, user 102 requests content from access provider 104. Access provider 104 in turn requests the content from content providers 112, 114, 116 over communications link 110, Internet 108 and communications links 118, 120, 122. Content providers 112, 114, 116 provide the content to access provider 104 over communications links 118, 120, 122, Internet 108 and communications link 110. Access provider 104 then provides the content to user 102.

The primary benefit afforded by the retrieval approach is that the content provided to user 102 is generally the most recent content available from content providers 112, 114, 116 since the content is retrieved directly from content providers 112, 114, 116. The "freshness" aspect of the retrieval approach is particularly desirable to content providers who want users to always access the most recent content. One disadvantage of the retrieval approach is that a full "roundtrip" is required from access provider 104 to content providers 112, 114, 116 and back to access provider 104 to retrieve data. Thus, the time required for access provider 104 to provide the content to user 102 is adversely affected by data transmission latencies and failures in Internet 108 and communications links 110, 118, 120, 122, and the response time of content providers 112, 114, 116. Another disadvantage of the retrieval approach is that content providers 112, 114, 116 may become overloaded when a large number of content requests are received in a short time interval.

According to the cache approach, the first time that user 102 requests content from access provider 104, the content is retrieved and provided to user 102 in the same manner as the retrieval approach just described. In addition, the content is stored on a local storage medium, such as a cache, of access provider 104. Thereafter, when any user connected to the Internet through access provider 104 requests the content, the content is provided the user from the cache of access provider 104, without being retrieved from content providers 112,114, 116.

Content maintained locally by access provider 104 is updated or refreshed from content providers 112, 114, 116 based upon a combination of subsequent user requests for the content and a particular heuristic or algorithm used by the access provider to determine when to refresh content. For example, suppose that content provider 112 generates a particular electronic document. When user 102 first requests the particular electronic document, access provider 104 retrieves the particular electronic document from content provider 112, provides the particular electronic document to user 102 and stores the particular electronic document in the cache of access provider 104. Sometime later, user 102 requests the same particular electronic document. In response to the request from user 102, access provider 104 applies a particular heuristic to determine whether the copy of the particular electronic document maintained in the cache of access provider 104 should be provided to user 102, or whether a new copy of the particular electronic document should be retrieved from content provider 112. For example, access provider 104 may determine whether the cached copy of the particular electronic document is sufficiently new. If the copy of the content stored in the cache of access provider 104 is deemed to be sufficiently new, based upon the heuristic, then the copy of content stored in the cache of access provider 104 is provided to user 102. If, however, based upon the heuristic, the copy of the content stored in the cache of access provider 104 is too old, then a new copy of the content is retrieved from content provider 112.

One of the benefits afforded by the cache approach is that content can generally be provided to user 102 from access provider 104 much faster than from content providers 112, 114, 116. Thus, the time required to provide content to user 102 is not adversely affected by data transmission latencies in Internet 108 and communications links 110, 118, 120, 122 or the response time of content providers 112, 114, 116. The cache approach also reduces the amount of loading on content providers 112, 114, 116.

Despite the performance advantage provided by the cache approach compared to the retrieval approach, the cache approach has several drawbacks. First, the first requestor of content must incur the performance penalty associated with retrieving content from content providers 112, 114, 116.

Second, there is no guarantee that content will be maintained indefinitely in the cache of access provider 104. As a practical consideration, access providers have only a finite amount of cache storage and therefore cannot maintain all content indefinitely. This problem is particularly acute on the Internet, where the amount of available content is growing at an extraordinary rate. Because of limited storage space, access providers typically employ an algorithm, such as a least-recently used algorithm, to select which content from their caches should be overwritten with new content. Once content is replaced, the next requestor must wait for the content to be retrieved from the appropriate content provider 112. In addition, replacement algorithms generally do not know whether a particular version of content is the most recent version of the content. Thus, content re-retrieved from content providers 112, 114, 116 may not be any different than the content that was previously replaced, resulting in wasted communications bandwidth and wasted loading of content providers 112, 114, 116.

Third, content that is maintained in cache may not be the most recent version of content from content providers 112, 114, 116 and may therefore be "stale." Limitations in heuristics and refresh algorithms therefore unavoidably cause some current content to be deleted and some old content not to be refreshed. Thus, the accuracy or coherence of access provider caches is adversely affected by limitations in the particular heuristic or refresh algorithm employed.

The cache approach effectively transfers the control of when users see new content from the content providers to the access providers. In addition to not having control over when new content will be made available to users, content providers 112, 114, 116 do not have any way of knowing statistics about access to their content by user 102, for example, which of their content is accessed and when their content is accessed by user 102. Being aware of access statistics for their content is very important to content providers because it allows them to better manage their content.

Given the need to provide content to users and the limitations in prior approaches, an approach for managing content that does not suffer from limitations of conventional approaches is highly desirable.

There is a need for an approach for providing content to users that provides greater control to content providers over which content is made available to users and allows the most recent content to be provided to users.

There is yet a further need for an approach for providing content to users that provides to content providers increased visibility into how and when users access their content.

SUMMARY OF THE INVENTION

According to one aspect of the invention, a method is provided for managing data stored in a cache. According to the method, a first version of data is provided in response to receiving a first request for the data. In response to detecting, independent of any request for the data, that a second more recent version of the data is available, the second more recent version of the data is retrieved and stored in the cache. A second user request for the data is received. In response to receiving the second user request for the data, the second more recent version of the data is retrieved from the cache and the second more recent version of the data is provided. In another embodiment, the first version of the data is deleted from the cache.

According to another aspect of the invention, a method is provided for managing data stored in a cache. The method includes selecting one or more data items from a plurality of data items stored on the cache based upon one or more selection criteria. A determination is made for each of the one or more data items whether a newer version of the data item is available, the determination being made independent of any request for any of the one or more data items. For each of the one or more data items where a newer version of the data item is available, the data item is deleted from the cache and the newer version of the data item is retrieved and stored in the cache.

According to another aspect of the invention, a method is provided for determining an amount of uncompressed data that is provided to a user. The method includes generating, based upon uncompressed data, compressed data. Size data that indicates the size of uncompressed data is added to the compressed data. The compressed data is provided to the user and, the amount of uncompressed data provided to the user is determined based upon the size data from the compressed data.

According to another aspect of the invention, a method is provided for managing content. A first version of content is retrieved from an origin server. The first version of the content is stored on a storage medium at a traffic server. In response to a first request for the content, the first version of the content is retrieved from the storage medium and provided. In response to detecting that a second more recent version of the content is available on the origin server, the first version of the content is deleted from the storage medium, the second more recent version of the content is retrieved from the origin server and the second more recent version of the content is stored on the storage medium. In response to a second request for the content, the second more recent version of the content is retrieved from the storage medium and provided.

According to another aspect of the invention, an apparatus for managing content on a cache is provided. The apparatus comprises a communications interface configured to communicate with the cache and a differencing mechanism communicatively coupled to the communications interface. The differencing engine is configured to detect, independent of any request for content, that a second more recent version of content is available and in response to detecting that the second more recent version of the content is available, retrieve the second more recent version of the content and cause the second more recent version of the content to be stored on the cache.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

In the following description, for the purposes of explanation, specific details are set forth in order to provide a thorough understanding of the invention. However, it will be apparent that the invention may be practiced without these specific details. In other instances, well-known structures and devices are depicted in block diagram form in order to avoid unnecessarily obscuring the invention.

An approach for managing and providing content to users is described hereinafter in the following sections: (1) functional overview and traffic server cache coherence; (2) managing user-specific content; (3) retrying failed requests; (4) updating multiple caches; (5) security issues; (6) cache pre-fetch; (7) cache fail-over; (8) content management; (9) content statistics; and (10) implementation mechanisms.

1. Functional Overvien and Traffic Server Cache Coherence

Figure 1:
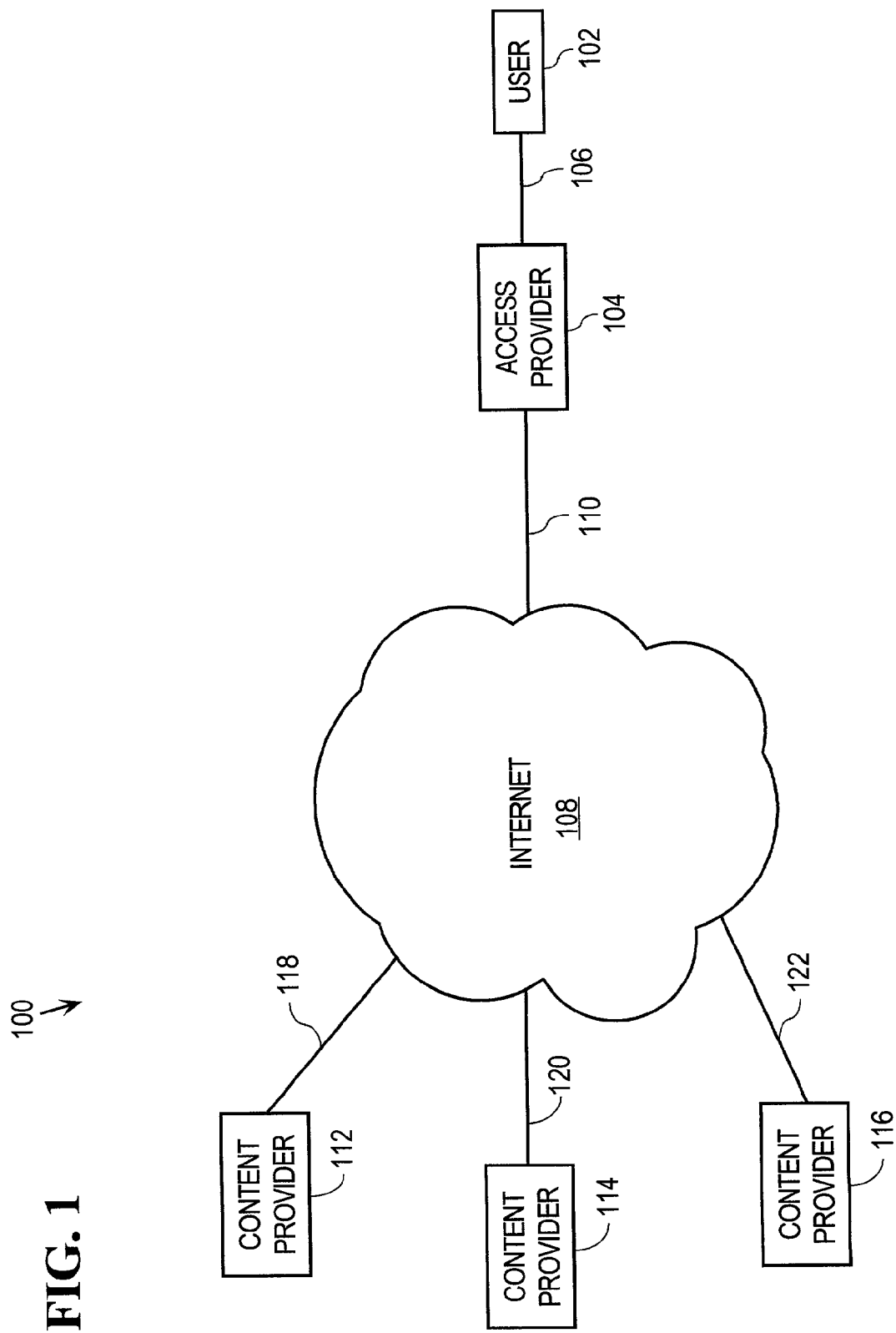
FIG. 1 is a block diagram of a conventional arrangement for providing Internet content to a user.
Figure 2A:
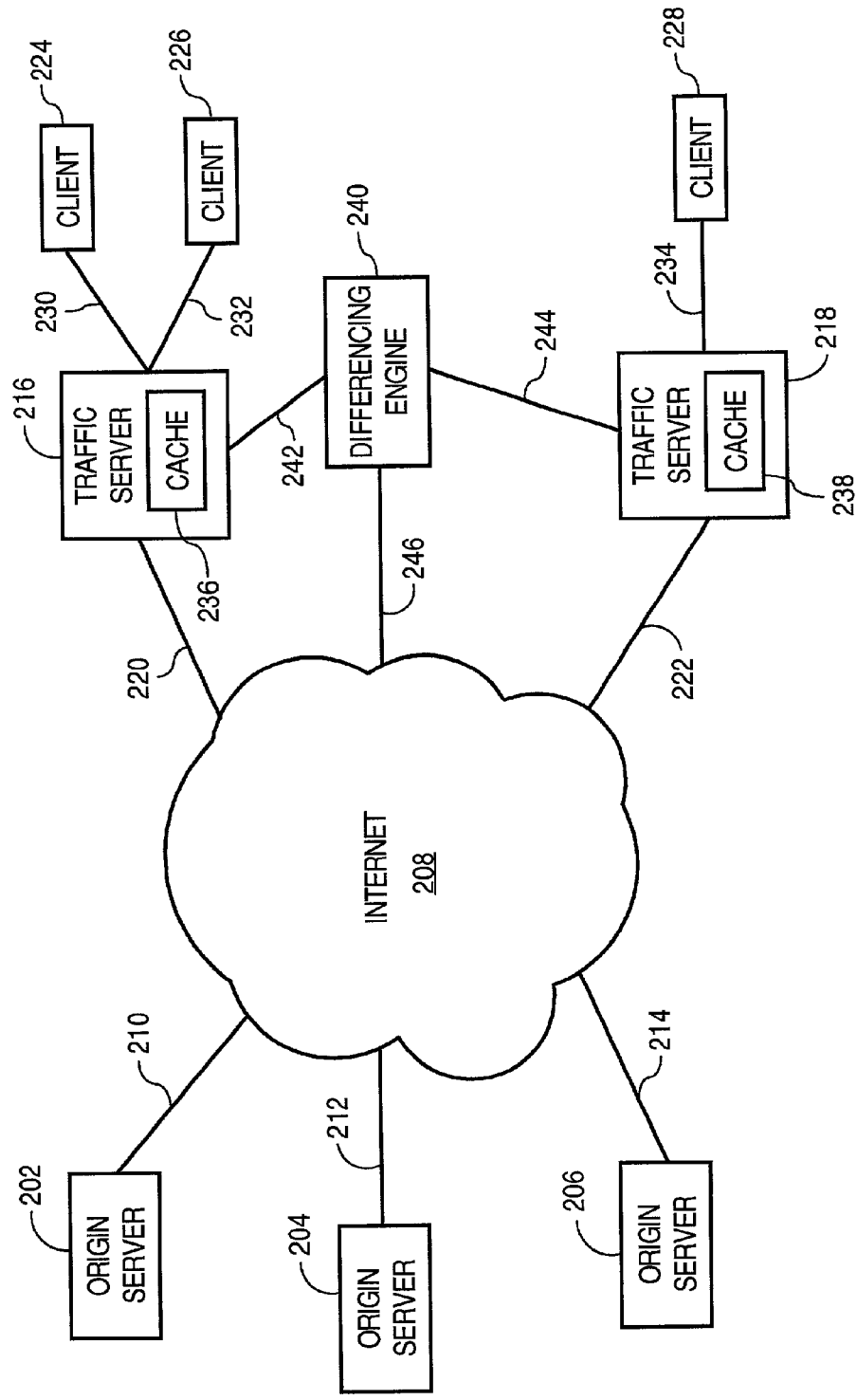
FIG. 2A is a block diagram of an arrangement for maintaining content according to an embodiment of the invention.

FIG. 2A is a block diagram of an arrangement 200 for managing and providing content to users over a communications link according to an embodiment of the invention. A set of origin servers 202, 204, 206 host content from one or more content providers (not illustrated). Origin servers 202, 204, 206 may be implemented by any type of hardware or software mechanism, but for purposes of explanation only, are illustrated and described in the context of servers. Origin servers 202, 204, 206 make content available to the Internet 208 via a set of communications links 210, 212, 214. Communications links 210, 212, 214 may be implemented by any mechanism or medium that provides for the exchange of data between origin servers 202, 204, 206 and Internet 208.

From the Internet 208, content is provided to traffic servers 216, 218 over communications links 220, 222. Content is provided from traffic servers 216, 218 to clients 224, 226, 228 over communications links 230, 232, 234, respectively. Traffic servers 216, 218 are mechanisms that control the flow of traffic, i.e., content, between the Internet 208 and clients 224, 226, 228. Traffic servers 216, 218 are typically implemented in, or otherwise associated with, access providers (not illustrated). For example, some access providers include, as part of their systems, a traffic server that controls the flow of data between the Internet and clients of subscribers to their services.

In the present example, traffic servers 216, 218 are configured with caches 236, 238, respectively, that provide local storage for content. Although caches 236, 238 are used for purposes of explanation, any type of local storage may be used. For purposes of explanation, caches 236, 238 are illustrated as a single box, but may be implemented as multiple caches, a network of caches, or a storage area network (SAN). Content stored in caches 236, 238 can generally be provided to clients 224, 226, 228 relatively more quickly than content stored in origin servers 202, 204, 206 since the retrieval by clients 224, 226, 228 of content from caches 236, 238 is not delayed by latencies and failures of communications links 210, 212, 214, 220, 222, 230, 232, 234 and the Internet 208.

Arrangement 200 includes a differencing engine 240 that is communicatively coupled to traffic servers 216, 218 via communications links 242, 244, respectively, and to Internet 208 via a communications link 246. According to one embodiment of the invention, differencing engine 240 is configured to selectively cause content on traffic servers 216, 218 to be refreshed. More specifically, differencing engine 240 is configured to selectively cause content to be deleted from traffic servers 216, 218 and/or replaced with newer versions of the deleted content from origin servers 202, 204, 206. Traffic servers 216, 218 may initiate the retrieval of replacement content after content is deleted. Alternatively, traffic servers 216, 218 may save storage space by waiting until a user request for the deleted content is received before retrieving replacement content. Thus, differencing engine 240 may selectively cause content to be deleted without necessarily replacing the deleted content with a more recent version of the content.

Deleting content from traffic servers 216, 218 may be performed using a variety of techniques and the invention is not limited to any particular technique. According to one embodiment of the invention, differencing engine 240 causes content to be deleted from traffic servers 216, 218 by issuing one or more "delete" commands to traffic servers. For example, in the context of the HTTP protocol, differencing engine 240 issues an "HTTP DELETE" command to traffic servers 216, 218 to cause content to be deleted.

The selection of content to be deleted from traffic servers 216, 218 may be determined according to a variety of selection criteria. According to one embodiment of the invention, differencing engine 240 selects content to be deleted by comparing versions of content stored on caches 236, 238 to versions of the corresponding content stored on origin servers 202, 204, 206. Versions of content on caches 236, 238 that are older than versions of the corresponding content on origin servers 202, 204, 206 are selected for deletion. For example, suppose that a first version of a particular electronic document is generated and stored on origin server 202. The first version of the particular electronic document is provided to traffic server 216 and stored in cache 236, for quick retrieval by clients 224, 226. Sometime later, a second more recent version of the particular electronic document is created by a content provider and stored on origin server 202. Differencing engine 240 detects that the first version of the particular electronic document stored in cache 236 is different than the second more recent version of the particular electronic document stored on origin server 202. Differencing engine 240 then causes the first version of the particular electronic document to be deleted from cache 236 and replaced with the second more recent version of the particular electronic document from origin server 202. Differencing engine 240 may use a variety of techniques to determine differences between content stored on traffic servers 216, 218 and origin servers 202, 204, 206. For example, differencing engine 240 may request from origin servers 202, 204, 206 information about versions of data stored on origin servers 202, 204, 206 that are also stored on traffic server 216, 218. As another example, differencing engine 240 may negotiate with origin servers 202, 204, 206 to periodically receive information about versions of data stored on origin servers 202, 204, 206 that is also stored on traffic servers 216, 218.

The approach just described may be selectively applied, based upon a variety of selection criteria, to content stored in caches 236, 238. Example selection criteria include, without limitation, the source of data, the type of data and particular users of data. For example, suppose a content provider enters into an agreement with an access provider to provide particular content to users. The content provider creates the content and provides the content to a content host that owns and operates origin server 202. The content host stores the content on origin server 202 and also provides the content to the access provider's traffic server 216. As part of the agreement between the content provider and the access provider, the access provider agrees to manage the particular content differently than other content. For example, the particular content may be maintained on traffic server 216 without being replaced using conventional heuristics or algorithms. Rather, the particular content is maintained until differencing engine 240 determines that a more recent version of the particular content is available on origin server 202. When differencing engine 240 determines that a more recent version of the particular content is available on origin server 202, differencing engine 240 causes the current version of the particular content to be deleted from cache 236 and replaced with the updated version of the particular content from origin server 202. Traffic server 216 may also store other content that is managed by differencing engine 240 or by traffic server 216 using conventional replacement heuristics and algorithms.

For purposes of explanation, differencing engine 240 is depicted and described in the context of being communicatively coupled to traffic servers 216, 218 to perform the described functions. Differencing engine 240 may be located elsewhere and the invention is not limited to any particular location of differencing engine 240. For example, according to one embodiment of the invention, differencing engine 240 is co-located with, or at least communicatively coupled to, origin servers 202, 204, 206. In this situation, differencing engine 240 interacts directly with origin servers 202, 204, 206 to determine when new content is available and to "push" the new content to traffic servers 216, 218.

Figure 2B:
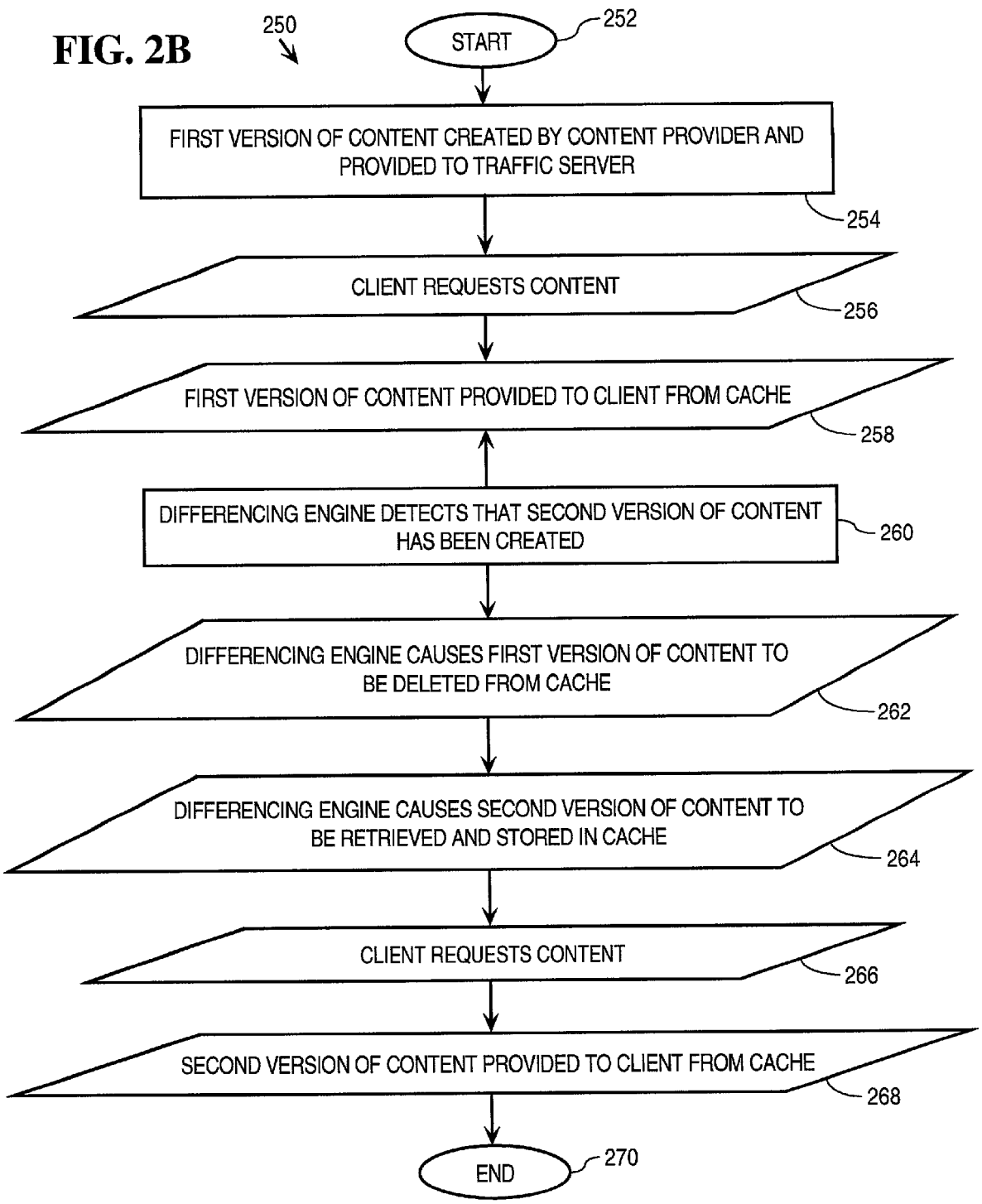
FIG. 2B is a flow diagram of an approach for maintaining content according to an embodiment of the invention.

FIG. 2B is a flow diagram 250 of an approach for managing and providing content to users according to an embodiment of the invention. After starting in step 252, in step 254, a first version of content is created by a content provider and provided to traffic server 216. Significantly, the content may be provided to the cache proactively, not in response to a client actually requesting the content. The content is stored in cache 236. In step 256, client 224 requests the content from traffic server 216. In step 258, the first version of the content is provided to client 224 from cache 236. In step 260, differencing engine 240 detects that a second version of the content has been created and is available. In step 262, differencing engine 240 causes the first version of content to be deleted from cache 236. In step 264, differencing engine 240 causes the second version of the content to be retrieved and stored in cache 236. Sometime later, in step 266, client 224 requests the content from traffic server 216. In step 268, the second version of the content is provided to client 224 from cache 236. The process is complete in step 270.

2. Managing User-Specific Content

In some situations content maintained on traffic servers is user-specific content. For example, content may contain information that is specific to a particular user or content may be formatted to support a particular client or browser employed by a particular user. According to one embodiment of the invention, data is maintained to indicate associations between content and users so that content may be managed on a user-specific basis. For example, in the context of web page content, web pages may be stored in traffic server caches using a hash table of web page Uniform Resource Locators (URLs) and user identification (ID) data. An example of user ID data is an IP address of a user's computer. A binary tree (B-tree) or two separate indexes built on URL and user IDs may also be used. Requests to delete particular user-specific content may be directed by differencing engine 240 to one or more traffic servers 216, 218 that service the client associated with the particular user. For example, differencing engine 240 may maintain data that specifies a mapping of user-specific content to traffic servers to enable differencing engine 240 to determine where to send requests to delete user-specific content.

3. Retrying Failed Requests

There may be circumstances when a request to delete content from a traffic server cannot be processed. This situation may occur, for example, if a traffic server is unavailable, or if communications links between a differencing engine and traffic server fail. Referring to FIG. 2, suppose that differencing engine 240 is assigned to maintain particular content from origin server 202 on traffic server 216. Traffic server 216 may be unavailable at the time differencing engine 240 requests the particular content to be deleted from traffic server 216. Alternatively, origin server 202 may be unavailable to provide an updated version of the particular content to traffic server 216. A failure of communications links 210, 220, 242 or Internet 208 may prevent either the deletion of the particular content from traffic server 216 or providing a new version of the particular content from origin server 202 to traffic server 216.

According to one embodiment of the invention, requests to delete content and to retrieve new versions of content are queued so that the requests may be re-submitted and processed in the circumstances described above. Requests to delete content from traffic server 216 may be queued at traffic server 216 or differencing engine 240 and resubmitted for processing after the problem has been resolved. Requests to retrieve new versions of content may be queued at traffic server 216 or at origin server 202. A daemon process may be employed to manage the queuing of requests.

4. Updating Multiple Caches

In some situations, differencing engine 240 may not know which caches contain copies of content to be deleted. In this situation, differencing engine 240 may have to send a request to delete content to a large number of caches, which can require a significant amount of time to perform, particularly if some caches are located in a different network than differencing engine 240. According to one embodiment of the invention, this problem is addressed by logically arranging caches in hierarchical parent-child cache relationships. Differencing engine 240 then sends requests to delete content to only the highest level parent caches in the hierarchy. The parent caches propagate the requests to their child caches. Thus, upon receiving the requests, each cache deletes the identified content from its own cache (if it contains the identified content) and forwards the deleted request to its child caches (if any).

Figure 3A:
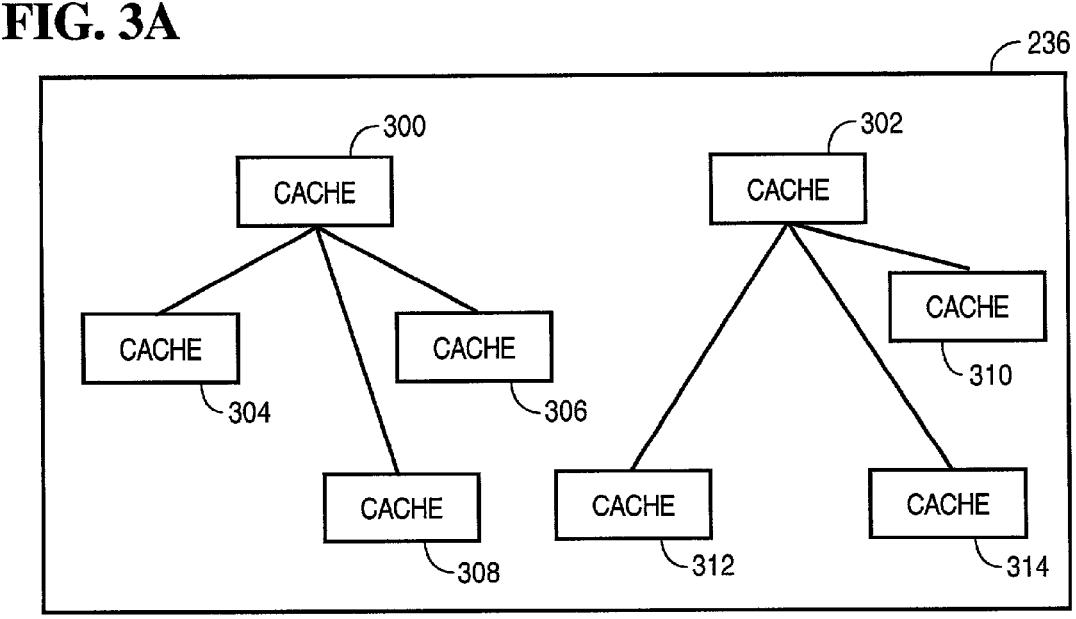
FIG. 3A is a block diagram that illustrates logical parent-child cache relationships according to an embodiment of the invention.

FIG. 3A is a block diagram of an example embodiment of cache 236 that includes caches 300-314. According to this embodiment, caches 300-314 are logically arranged in parent-child relationships. Specifically, caches 300, 302 are designated as parent caches 300, 302. Parent cache 300 is logically related to child caches 304, 306, 308. Parent cache 302 is logically related to child caches 310, 312, 314.

While the illustrated cache hierarchy includes only two levels, the techniques described herein are not limited to such an embodiment. For example, the hierarchy may have many levels where many caches serve both as children and as parents. According to the illustrated embodiment, differencing engine 240 sends a request to delete content to parent caches 300, 302, instead of to all caches 300-314. Parent caches 300, 302 then forward the request to the appropriate cache for processing, which in some situations may be the parent caches 300, 302 themselves. Parent caches 300, 302 may maintain data that specifies what content is stored on caches 300-314. Specifically, parent cache 300 may maintain data that specifies what data is stored on caches 304, 306, 308. Similarly, parent cache 302 may maintain data that specifies what data is stored on caches 310, 312, 314. This approach reduces the number of caches that differencing engine 240 must interact with, providing a reduction in computational resources and time.

For example, suppose that particular data to be deleted is stored on cache 314. Without the logical parent-child cache relationships, or specific knowledge of which caches are storing which data, differencing engine 240 must send a request to delete the particular data to all caches 300-314. Using the cache hierarchy, however, differencing engine 240 needs to send a request to delete the particular content to only parent cache 302. Parent cache 302 then examines the data that it maintains to determine where the particular data is stored. In this example, parent cache 302 determines that the particular data to be deleted is stored on cache 314. Accordingly, cache 302 forwards the request to delete the particular data to cache 314.

There may be situations where a parent cache fails (or a communications link to a parent cache fails) and a request to delete content does not reach a child cache. Therefore, according to one embodiment of the invention, redundant parent caches are used to increase the likelihood that a request to delete content reaches its intended destination. According to this approach, two or more caches serve as parent caches to the same one or more child caches to provide redundancy.

Figure 3B:
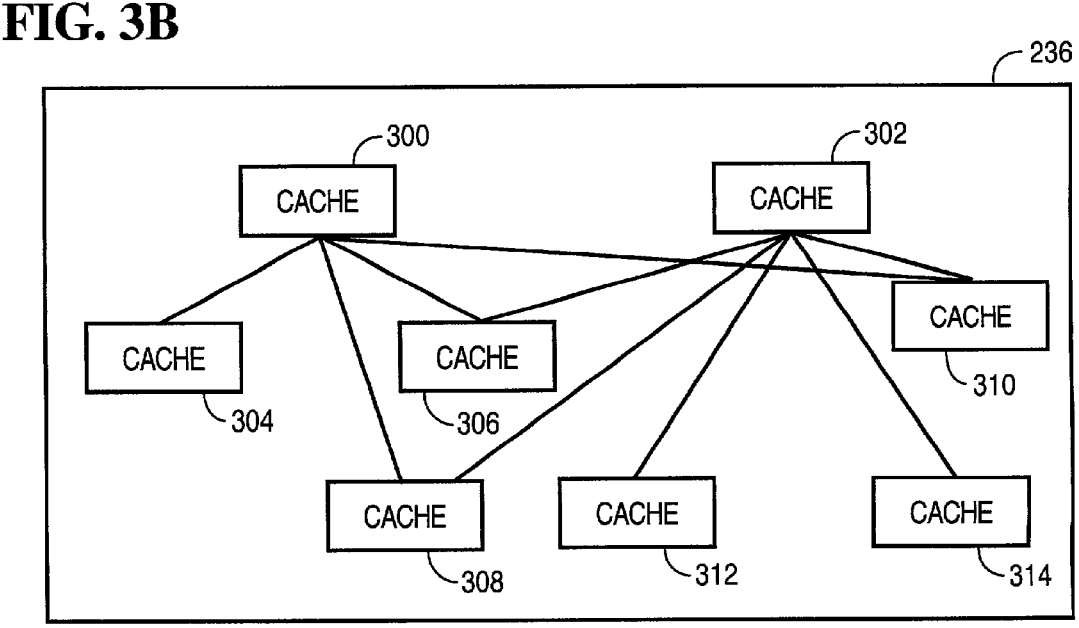
FIG. 3B is a block diagram that illustrates redundant parent-child cache relationships according to an embodiment of the invention.

FIG. 3B is a block diagram of an example embodiment of cache 236 that uses redundant parent-child relationships. In this example, parent cache 300 serves as the parent cache for caches 304, 306, 308 and also cache 310. Parent cache 302 serves as the parent cache for caches 310, 312, 314 and also for caches 306, 308. In this situation, if parent cache 302 fails, then a request to delete content stored on cache 310 is still provided to cache 310 by parent cache 300. Similarly, if parent cache 300 fails, a request to delete content on caches 306 or 308 is still provided to caches 306, 308 by parent cache 302. Parent caches 300, 302 may share data about what data is stored on caches 300-314. Alternatively, caches 300, 302 may maintain separate data about data stored on caches 300-314.

In the present example, the redundant parent-child cache relationships have been illustrated and described as being selectively applied to caches 306, 308, 310. Thus, redundancy does not need to be provided for all child caches 304, 306, 308, 310, 312, 314. In situations where neither of caches 300, 302 has failed, duplicate requests will be sent to the same child cache. Therefore, according to one embodiment of the invention, various mechanisms may be employed to prevent the same request from being processed more than once by the same child cache. For example, child caches may store processed requests in a queue so that the processing of redundant requests can be avoided. As another example, various delete request criterion may be used to prevent multiple requests to delete data from being processed by a child cache. For example, a time criteria may be used so that multiple requests to delete particular data that are received within a specified time are only processed once by a child cache.

5. Security Issues

There are several security issues that may affect the arrangements described herein for providing content to users. First, unauthorized users may attempt to store content on caches. Second, unauthorized users may attempt to delete content from caches. According to one embodiment of the invention, requests to store or delete content are screened to determine whether the requests originated from an authorized source or entity. Domain, URL or IP address controls may be implemented to ensure that a request to store or delete content originates from an authorized location. For example, referring to FIG. 2, suppose that an unauthorized user sends a request to delete content to traffic server in an attempt to delete content from cache 236. Traffic server 216 checks a list of authorized users, domains, URLs or IP addresses to determine whether the request is from an authorized user. If so, then the request to delete the content from cache 236 is processed normally. If not, then the request is not processed. According to another embodiment of the invention, requests to store content to or delete content from caches performed in a secure manner, e.g., via encryption, authentication, or both. This may involve the use of a secure communications link or communications protocol, depending upon the requirements of a particular application.

Another type of security threat is referred to as a "replay attack," where requests to store or delete content are sent repeatedly in an attempt to overwhelm a cache. For example, suppose that an unauthorized user wishes to interfere with the operation of cache 238. Using a replay attack, the unauthorized user repeatedly sends to traffic server 218 requests to store and delete data from cache 238. Sending a sufficiently large number of requests in a specified period of time may overwhelm traffic server 218, rendering cache 238 effectively unusable. According to another embodiment of the invention, redundant requests received within a specified period of time are ignored, under the assumption that the redundant requests originate from an unauthorized user attempting a replay attack. The specified amount of time, and the content to which the test applies, may be selected depending upon the requirements of a particular application. For example, suppose that for all content stored on cache 238, the specified amount of time is set to 0.1 seconds. In this situation, traffic server 218 ignores redundant requests to store or delete content on cache 238 received within 0.1 seconds.

6. Cache Pre-Fetch

According to one embodiment of the invention, content is "pre-fetched", i.e., retrieved, from an origin server and stored in a cache, irrespective of whether a client has requested the content. Cache pre-fetch may be employed for content that has been deleted from a cache, as well as for new content that may have never before been stored in cache. This approach can significantly reduce the amount of time required to provide requested content to a client since the content is already stored, i.e., pre-fetched, in the cache of a traffic server when a request for the content is received from a client. Thus, the client does not have to wait for the content to be retrieved from an origin server. For example, referring to FIG. 2, suppose that new content is created by a content provider and stored on origin server 206. According to one embodiment of the invention, differencing engine 240 detects that the new content is available on origin server 206 and requests the new content from origin server 206. The new content is stored in cache 236. Differencing engine 240 may use a variety of techniques to detect that new content is available on origin server 206. For example, differencing engine 240 may periodically poll origin server 206 to determine what new content has been stored on origin server 206. Differencing engine 240 may also be periodically informed by origin server 206 about new data stored on origin server 206. Data may also be generated and stored in another location (not illustrated) that indicates new data that has been stored and is available on origin server 206.

Pre-fetch may be implemented on a content-specific or a user and content-specific basis. For example, a content provider may contract with an access provider to have all of the content provider's content stored on origin server 204 pre-fetched into traffic server 218 to provide preferential access to the content by client 228. As another example, the content provider may contract with the access provider and the user associated with client 228 to have the content provider's content that is specific to the user pre-fetched into traffic server 218.

According to one embodiment of the invention, pre-fetched content is automatically deleted from a cache after the expiration of a specified period of time during which no user requests for the content are received. This essentially provides a "housekeeping" function to delete "old" pre-fetched content from caches. For example, suppose that particular content is pre-fetched from origin server 204 into cache 238 of traffic server 218. A specified time limit may be employed to limit the amount of time that the particular content remains in cache 238 without a request for the particular content.

The pre-fetch approach may be implemented separate from or in conjunction with the delete, i.e., invalidation, approach described herein. For example, pre-fetch may be implemented as part of a "delete and pre-fetch" command issued by differencing engine 240 to traffic servers 216, 218, (or a daemon process or agent of traffic servers 216, 218) or as a separate "pre-fetch" command. In addition, a pre-fetch queue may be employed to enable pre-fetch requests to be re-issued if an origin server is unavailable. For example, suppose that differencing engine 240 detects that new content is available from origin server 204. Differencing engine 240 issues a pre-fetch command to traffic server 218 to retrieve and store the new content in cache 238. Traffic server 218 issues a pre-fetch command to origin server 204, but an error or unavailability of origin server 204 prevents the new content from being provided to traffic server 218. In this situation, traffic server 218 may be configured with a pre-fetch request queue. The pre-fetch request for the new content is placed in the pre-fetch request queue for later processing, when origin server 204 becomes available.

7. Cache Fall-Over

Cache failures sometimes result in the loss of content data. Caches can fail for a variety of reasons, such as power failure, and are sometime unavoidable, despite efforts to avoid them. According to one embodiment of the invention, an approach referred to herein as "cache fail-over" is used to address the problem of cache failures. According to the cache fail-over approach, requests to delete and pre-fetch content sent to a first cache are also sent to one or more other caches. The one or more other caches store the delete and pre-fetch requests and process the requests if the first cache fails. Thus, the one or more other caches provide redundant protection for content and pending requests stored in the first cache. For example, referring to FIG. 3A, suppose that particular content is stored in cache 304. Requests sent to cache 304 to delete and pre-fetch content are also sent to cache 306. If cache 304 fails, then the requests stored on cache 306 are processed to reconstruct the content contained in cache 304 at the time cache 304 failed.

According to another embodiment of the invention, a portion or all of the requests stored on cache 306 are processed prior to a failure of cache 304 to provide additional ("mirror") copies of some or all of the content in cache 306. This approach reduces the amount of time required to make content available to users after a failure since a portion or all of the content has already been copied to cache 306 prior to a failure of cache 304. Referring to the prior example, requests sent to cache 304 to delete and pre-fetch content are also sent to cache 306. One or more of the requests are processed, creating additional copies of some content on cache 306. If cache 304 fails, then some content may be made immediately available to users. The remaining requests are then processed to reconstruct the remaining content contained in cache 304 at the time cache 304 failed. Various heuristics or algorithms, such as a most recently used algorithm, may be used to select which requests are pre-processed and the invention is not limited to any particular algorithm or approach. This approach may be implemented for all requests sent to cache 304, making cache 306 a complete "mirror" of cache 304, albeit at the expense of the additional storage required.

8. Content Management

Content objects can vary dramatically in size, from relatively small text files or HTTP objects to relatively large content objects, such as streaming media objects. Because cache space is not unlimited, large content objects can be difficult to manage. For example, storing in a cache a relatively new streaming media object may cause a large number of small objects to be deleted from a cache to provide room to store the streaming media object. This may occur when older objects are deleted to make room to store for relatively newer objects.

According to one embodiment of the invention, preferential treatment is given to certain content objects relative to other content objects to prevent the deletion of the certain content objects. Preferential treatment may be based upon a variety of object attributes. Some example object attributes that may be used to provide preferential treatment include, without limitation, object type, object size and object origin, i.e., from a particular origin server or domain. For example, in the context of Web page type content, almost any portion of an HTTP header may be used as a basis for providing preferential treatment. Preferential treatment may be used to specify whether certain objects can be deleted at all, a minimum amount of time that an object must remain in a cache before being deleted, or a relative priority to establish an order in which objects are deleted from a cache, when necessary.

According to another embodiment of the invention, storage quotas are used to guarantee a minimum amount of space to particular content providers, report cache usage, detect storage over-runs and delete content when no space is available. A time quota component may also be incorporated to identify the age of particular content. For example, referring to FIG. 2, suppose that a content provider enters into an agreement with an access provider to host the content provider's content on traffic server 216. The access provider further agrees to guarantee a specified amount of space for the content provider's content. Under this arrangement, the content provider's content is given a preference or priority over other content stored in cache 236. Thus, the content provider is guaranteed the minimum amount of space and other content will be deleted if necessary to provide the minimum amount of space. According to one embodiment of the invention, the amount of space used by the content provider's content is reported to the content provider. Any space over-runs are also reported to the content provider by the access provider. The content provider and access provider may agree upon a particular approach to be used when the allocated space is insufficient to store all of the content of the content provider. For example, the content provider and access provider may agree that the oldest or least recently used content is deleted first.

9. Content Statistics

Conventional traffic servers typically generate a transaction log that records each transaction relating to operations on content stored in cache. For example, transaction logs typically record client requests for content from a cache. The amount of data generated by each traffic server can be enormous since each transaction is stored in the log. These log files are then typically transferred to an offline location (collection node) and aggregated and processed. The large size of the log files places a large strain on network resources and bandwidth. In addition, log files indicate what requests have been made by clients, but do not provide information about the state of particular caches or content.

A. Feedback on New Content

According to one embodiment of the invention, two queues are used to track requests to delete and retrieve content. The first queue holds requests until they are processed. The second queue holds requests that could not be processed, for example, because of failure of a cache, an origin server, or a communications link. By examining the contents of the two queues, immediate feedback can be provided to content providers on which caches and content have been updated and which have not.

For example, referring to FIG. 2, suppose that a content provider enters into an agreement with an access provider for the access provider to host the content provider's content on traffic server 216. Two queues are established for cache 236. Requests to delete content and retrieve new content are stored in the first queue. As requests are successfully processed, the requests are removed from the first queue. Requests that cannot be processed are stored in the second queue. Additional attempts to process requests stored in the second queue may be periodically made. By examining the two queues, the content provider can be informed about the status of content, such as whether old content has been deleted from cache 236 and whether new content has been retrieved from origin server 202.

B. Distributed Log Entry Aggregation

According to one embodiment of the invention, cache activity is aggregated and logged according to a set of specified logging criteria. The logging criteria may specify the number of content accesses over a specified period of time. For example, traffic server 216 may keep track of the number of accesses over a specified period of time for particular content stored in cache 236. Thus, instead of simply recording each access, which might require hundreds or thousands of log entries, a single entry may be stored to specify the number of accesses over a specified period of time. The single entry may specify the boundaries of the time interval. Additional entries may be made to record, for example, the first and last access made during the time interval. Many different logging criteria may be used and the invention is not limited to any particular logging criteria. Examples of other logging criteria include, without limitation, an amount of data accessed from a cache during a specified period of time, the amount of time required to access a specified amount of data and an average amount of time required to process access requests. The logging criteria may be specified by a user, a content provider or an access provider and the invention is not limited to any particular approach for selecting the logging criteria. This approach aggregating access data "on-the-fly" reduces the amount of data stored in a log file for a specified period of time compared to traditional logging approaches, thereby reducing the amount of data that must be transferred over communications links. In addition, the approach does not sacrifice accuracy, which might occur if a sampling approach was used to reduce the amount of data in a log file. Aggregate data from multiple caches may also be aggregated to generate statistics for a set of caches.

Consider the following example. Suppose that according to a conventional logging approach, the following information is collected and logged: time of access (seconds); amount of data served (bytes); and the amount of time required to process the request (milliseconds). So, an example set of conventional log entries might look like the following:

| TIME OF ACCESS | AMOUNT OF DATA SERVED | PROCESS TIME |
|---|---|---|
| 943053611 | 256 | 130 |
| 943053611 | 1024 | 200 |
| 943053611 | 256 | 120 |
| 943053611 | 512 | 140 |
| 943053611 | 128 | 100 |
| 943053612 | 256 | 200 |
| 943053612 | 2048 | 400 |
| 943053612 | 64 | 30 |
| 943053612 | 256 | 120 |
| 943053612 | 128 | 90 |

According to an embodiment of the invention, the data is aggregated based upon the following definition: LAST (access time); SUM (bytes served); AVERAGE (time to process). For a one second interval, only two log entries are required as follows:

| 943053611 | 2176 | 138 |
|---|---|---|
| 943053612 | 2752 | 168 |

Thus, the amount of data that must be stored in the log file is substantially reduced.

C. Billing Issues

Access providers generally bill content providers based upon the amount of content that is provided to users.

According to one embodiment of the invention, access providers may use a variety of billing criteria to bill content providers for hosting content. Examples of billing criteria include, without limitation, the amount of content provided or served to client, the amount of storage reserved for a particular content provider, the amount of storage actually used by content for the content provider and the duration of storage used to store content for the content provider. Data determined from the distributed log entry aggregation technique described herein may be used by access providers to bill content providers including, for example, the amount of data provided to clients.

Is some situations, content is stored in caches in a compressed format to save storage space. Since compressed content is smaller in size than uncompressed content, billing based upon the amount of compressed content provided to clients would not accurately reflect the amount of content that is provided to clients, once the compressed content is decompressed. Therefore, according to one embodiment of the invention, for compressed content, data is added to the compressed content to specify the amount or size of the uncompressed content. When the compressed content is provided to a client, the data that specifies the amount or size of the uncompressed content is used for statistical and billing purposes. For example, suppose that compressed content is maintained in cache 236. The compressed content has a size of (500) bytes while the uncompressed version of the same content has a size of (1000) bytes. Data is added to the compressed content, e.g., in the header, to indicate that the size of the uncompressed content is (1000) bytes. When the compressed content is provided to client 224, the size of the uncompressed version of the content, i.e., (1000) bytes, is used for statistical and billing purposes. The actual implementation of this approach may vary depending upon the requirements of a particular application and the invention is not limited to any particular implementation. For example, in the context of HTTP web pages, the uncompressed content length is stored in the HTTP header.

In some situations, the transfer of large blocks of content is aborted before the entire block of content is provided to users. This situation can occur, for example, when a user is downloading a large chunk of media content over the Internet and aborts the transfer by typing a different URL into their browser. If the content that was being transferred was uncompressed content, then the amount of uncompressed content that was actually transferred prior to the abort can usually be determined fairly accurately. If the content that was being transferred was compressed content, then the amount of content actually transferred does not accurately reflect the amount of content transferred in uncompressed form. Therefore, according to one embodiment of the invention, the amount of uncompressed data actually transferred is determined based upon the product of the ratio of compressed content transferred to the amount of compressed content and the size of the uncompressed content, or:

UCT=(CCT/CCS)*UCS

Where:
UCT is the amount of uncompressed content transferred;
CCT is the amount of compressed content transferred;
CSS is the size of the compressed content; and
UCS is the size of the uncompressed content.

Thus, knowing the size of the compressed content and how much compressed content was actually transferred, the corresponding amount of uncompressed content transferred may be determined.

10. Implementation Mechanisms

The approach for providing content to users may be implemented over any type of communications link and is not limited to the Internet context. The approach may be implemented at any type of intermediary, such as shopping portals, or as a stand-alone mechanism. The approach may also be implemented at merchant sites. Embodiments of the invention may be implemented in hardware circuitry, in computer software, or a combination of hardware circuitry and computer software and the invention is not limited to a particular hardware or software implementation.

Figure 4:
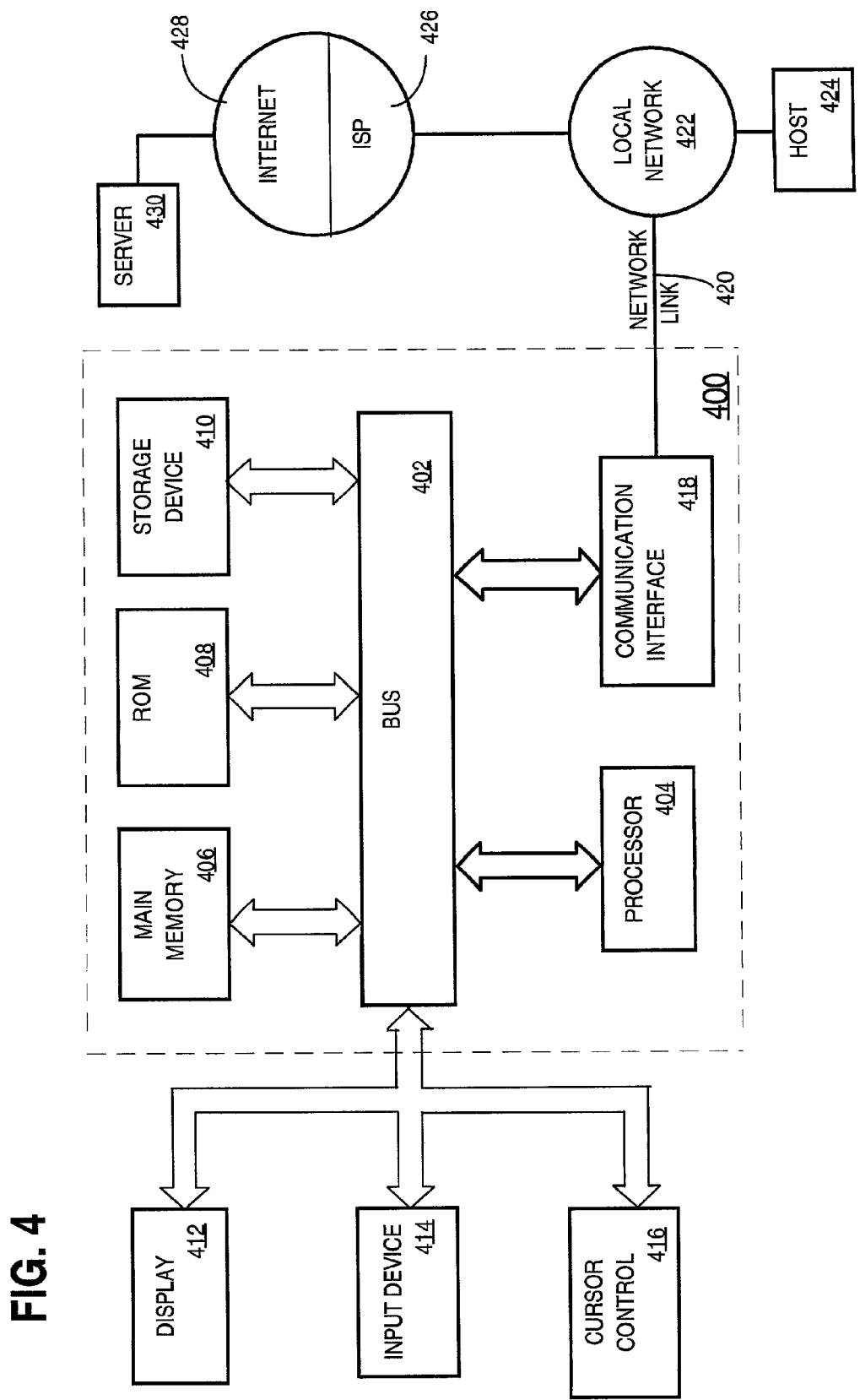
FIG. 4 is a block diagram of a computer system upon which embodiments of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for managing and providing content to users. According to one embodiment of the invention, an approach for managing and providing content to users is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for managing and providing content to users as described herein.

The received code may be executed by processor 404 as it is received, and/or stored in storage device 410, or other non-volatile storage for later execution. In this manner, computer system 400 may obtain application code in the form of a carrier wave.

The novel approach described herein for providing content to users gives content providers direct control over their content maintained by access providers. Specifically, content providers can be guaranteed that particular content remains indefinitely in the caches of particular access providers. This is true even for access providers that employ heuristics or algorithms to delete certain content from their caches. In addition, the approach guarantees that the most recent versions of particular content are maintained in the caches of access providers. Thus, users are able to retrieve the most recent content directly from the caches of access providers and do not have to wait for content to be retrieved from content providers. The approach may be selectively applied to particular access providers or to particular content, including user-specific content, and is therefore very flexible. The approach also provides access statistics to content providers about how their content is accessed by users.

In the foregoing specification, the invention has been described with reference to specific embodiments thereof. However, various modifications and changes may be made thereto without departing from the broader spirit and scope of the invention. The specification and drawings are, accordingly, to be regarded in an illustrative sense rather than a restrictive sense.

What is claimed is:

1. A computer-implemented method for managing data stored in a cache comprising:
    providing a first version of data in response to receiving a first request for data;
    detecting, independent of any request for the data, that a second more recent version of the data is available;
    in response to detecting, independent of any request for the data, that the second more recent version of the data is available,
        storing, in a location other than the cache, a request to retrieve and store in the cache the second more recent version of the data,
        processing the request to retrieve and store in the cache the second more recent version of the data,
        if the request to retrieve and store in the cache the second more recent version of the data cannot be processed successfully, then after expiration of a specified time,
            retrieving from the location other than the cache, the request to retrieve and store in the cache the second more recent version of the data,
            re-processing the request to retrieve and store in the cache the second more recent version of the data,
        receiving the second more recent version of the data, and
        storing in the cache the second more recent version of the data;
    receiving a second request for the data; and
    in response to receiving the second request for the data,
        retrieving the second more recent version of the data from the cache, and
        providing the second more recent version of the data.

2. The method as recited in claim 1, further comprising the step of deleting the first version of the data from the cache.

3. The method as recited in claim 2, further comprising the steps of:
storing, in a location other than the cache, a request to delete the first version of the data from the cache, and
if the request to delete the first version of the data from the cache cannot be successfully processed, then after expiration of the specified time,
retrieving from the location other than the cache, the request to delete the version of the data from the cache, and
processing again the request to delete the first version of the data from the cache.

4. The method as recited in claim 1, further comprising the step of if the second more recent version of the data cannot be retrieved and stored in the cache, then after expiration of the specified time, attempting to again retrieve and store in the cache the second more recent version of the data.

5. The method as recited in claim 1, further comprising the step of if, after expiration of the specified time from a time when the second more recent version of the data is stored in the cache, no further requests for the second more recent version of the data are received, then deleting the second more recent version of the data from the cache.

6. The method as recited in claim 1, further comprising providing data that indicates whether the second more recent version of the data was successfully retrieved and stored in the cache.

7. The method as recited in claim 1, further comprising causing a copy of the second more recent version of the data to be stored at a second cache.

8. The method as recited in claim 1, wherein the step retrieving and storing in the cache the second more recent version of the data is performed in response to processing one or more requests from an authorized entity.

9. The method as recited in claim 1, further comprising generating, based upon a set of logging criteria, log data that indicates one or more activities of the cache.

10. The method as recited in claim 9, wherein the set of logging criteria includes the size of the first version of data provided.

11. The method as recited in claim 9, wherein the set of logging criteria includes an amount of time required to provide the first version of data.

12. A computer-readable medium carrying instructions stored therein for managing data stored in a cache, wherein execution of the instructions by one or more processors causes:
providing a first version of data in response to receiving a first request for data;
detecting, independent of any request for the data, that a second more recent version of the data is available;
in response to detecting, independent of any request for the data, that the second more recent version of the data is available,
storing, in a location other than the cache, a request to retrieve and store in the cache the second more recent version of the data,
processing the request to retrieve and store in the cache the second more recent version of the data,
if the request to retrieve and store in the cache the second more recent version of the data cannot be processed successfully, then after expiration of a specified time,
retrieving from the location other than the cache, the request to retrieve and store in the cache the second more recent version of the data,
re-Processing the request to retrieve and store in the cache the second more recent version of the data,
receiving the second more recent version of the data, and
storing in the cache the second more recent version of the data;
receiving a second request for the data; and
in response to receiving the second request for the data,
retrieving the second more recent version of the data from the cache, and
providing the second more recent version of the data.

13. The computer-readable medium as recited in claim 12, further comprising one or more additional instructions which, when executed by the one or more processors, cause the one or more processors to perform the step of deleting the first version of the data from the cache.

14. The computer-readable medium as recited in claim 13, further comprising one or more additional instructions which, when executed by the one or more processors, cause the one or more processors to perform the steps of:
storing, in a location other than the cache, a request to delete the first version of the data from the cache, and
if the request to delete the first version of the data from the cache cannot be successfully processed, then after expiration of the specified time,
retrieving from the location other than the cache, the request to delete the first version of the data from the cache, and
processing again the request to delete the first version of the data from the cache.

15. The computer-readable medium as recited in claim 12, further comprising one or more additional instructions which, when executed by the one or more processors, cause the one or more processors to perform the step of if the second more recent version of the data cannot be retrieved and stored in the cache, then after expiration of the specified time, attempting to again retrieve and store in the cache the second more recent version of the data.

16. The computer-readable medium as recited in claim 12, further comprising one or more additional instructions which, when executed by the one or more processors, cause the one or more processors to perform the step of if, after expiration of the specified time from a time when the second more recent version of the data is stored in the cache, no further requests for the second more recent version of the data are received, then deleting the second more recent version of the data from the cache.

17. The computer-readable medium as recited in claim 12, further comprising one or more additional instructions which, when executed by the one or more processors, cause the one or more processors to perform the step of providing data that indicates whether the second more recent version of the data was successfully retrieved and stored in the cache.

18. The computer-readable medium as recited in claim 12, further comprising one or more additional instructions which, when executed by the one or more processors, cause the one or more processors to perform the step of causing a copy of the second more recent version of the data to be stored at a second cache.

19. The computer-readable medium as recited in claim 12, wherein the step retrieving and storing in the cache the second more recent version of the data is performed in response to processing one or more requests from an authorized entity.

20. The computer-readable medium as recited in claim 12, further comprising one or more additional instructions which, when executed by the one or more processors, cause the one or more processors to perform the step of generating, based upon a set of logging criteria, log data that indicates one or more activities of the cache.

21. The computer-readable medium as recited in claim 20, wherein the set of logging criteria includes the size of the first version of data provided.

22. The computer-readable medium as recited in claim 20, wherein the set of logging criteria includes an amount of time required to provide the first version of data.

23. A computer-implemented method for managing data stored in a cache comprising:
    providing, from a cache, a first version of data in response to receiving a first request for data;
    detecting, independent of any request for the data, that a second more recent version of the data is available;
    in response to detecting, independent of any request for the data, that the second more recent version of the data is available,
        storing in a location other than the cache, a request to retrieve and store in the cache the second more recent version of the data,
        processing the request to retrieve and store in the cache the second more recent version of the data,
        if the request to retrieve and store in the cache the second more recent version of the data cannot be processed successfully, then after expiration of a specified time,
            retrieving from the location other than the cache, the request to retrieve and store in the cache the second more recent version of the data,
            re-Processing the request to retrieve and store in the cache the second more recent version of the data,
        receiving the second more recent version of the data,
        storing in the cache the second more recent version of the data; and
        deleting the first version of the data from the cache.

24. The method as recited in claim 23, further comprising:
    retrieving and storing in the cache the second more recent version of the data; receiving a second request for the data; and
    in response to receiving the second request for the data,
        retrieving the second more recent version of the data from the cache, and
        providing the second more recent version of the data.

25. The method as recited in claim 23, further comprising the steps of:
    storing, in a location other than the cache, a request to delete the first version of the data from the cache, and
    if the request to delete the first version of the data from the cache cannot be successfully processed, then after expiration of the specified time,
        retrieving from the location other than the cache, the request to delete the first version of the data from the cache, and
        processing again the request to delete the first version of the data from the cache.

26. The method as recited in claim 24, further comprising the step of if the second more recent version of the data cannot be retrieved and stored in the cache, then after expiration of the specified time, attempting to again retrieve and store in the cache the second more recent version of the data.

27. The method as recited in claim 24, further comprising the step of if, after expiration of the specified time from a time when the second more recent version of the data is stored in the cache, no further requests for the second more recent version of the data are received, then deleting the second more recent version of the data from the cache.

28. The method as recited in claim 23, further comprising providing data that indicates whether the first recent version of the data was successfully deleted from the cache.

29. The method as recited in claim 24, further comprising causing a copy of the second more recent version of the data to be stored at a second cache.

30. The method as recited in claim 24, wherein the step retrieving and storing in the cache the second more recent version of the data is performed in response to processing one or more requests from an authorized entity.

31. The method as recited in claim 23, further comprising generating, based upon a set of logging criteria, log data that indicates one or more activities of the cache.

32. The method as recited in claim 31, wherein the set of logging criteria includes the size of the first version of data provided.

33. The method as recited in claim 31, wherein the set of logging criteria includes an amount of time required to provide the first version of data.

34. A computer-readable medium carrying instructions stored therein for managing data stored in a cache, wherein execution of the instructions by one or more processors causes:
    providing, from a cache, a first version of data in response to receiving a first request for data;
    detecting, independent of any request for the data, that a second more recent version of the data is available;
    in response to detecting, independent of any request for the data, that the second more recent version of the data is available,
        storing, in a location other than the cache, a request to retrieve and store in the cache the second more recent version of the data,
        processing the request to retrieve and store in the cache the second more recent version of the data,
        if the request to retrieve and store in the cache the second more recent version of the data cannot be processed successfully, then after expiration of a specified time,
            retrieving from the location other than the cache, the recluest to retrieve and store in the cache the second more recent version of the data,
            re-processing the request to retrieve and store in the cache the second more recent version of the data,
        receiving the second more recent version of the data,
        storing in the cache the second more recent version of the data; and deleting the first version of the data from the cache.

35. The computer-readable medium as recited in claim 34, further comprising one or more additional instructions which, when executed by the one or more processors, cause the one or more processors to perform the steps of:
    retrieving and storing in the cache the second more recent version of the data;
    receiving a second request for the data; and
    in response to receiving the second request for the data,
        retrieving the second more recent version of the data from the cache, and providing the second more recent version of the data.

36. The computer-readable medium as recited in claim 34, further comprising one or more additional instructions which, when executed by the one or more processors, cause the one or more processors to perform the steps of:
storing, in a location other than the cache, a request to delete the first version of the data from the cache, and
if the request to delete the first version of the data from the cache cannot be successfully processed, then after expiration of the specified time,
retrieving from the location other than the cache, the request to delete the first version of the data from the cache, and
processing again the request to delete the first version of the data from the cache.

37. The computer-readable medium as recited in claim 35, further comprising one or more additional instructions which, when executed by the one or more processors, cause the one or more processors to perform the step of if the second more recent version of the data cannot be retrieved and stored in the cache, then after expiration of the specified time, attempting to again retrieve and store in the cache the second more recent version of the data.

38. The computer-readable medium as recited in claim 35, further comprising one or more additional instructions which, when executed by the one or more processors, cause the one or more processors to perform the step of if, after expiration of the specified time from a time when the second more recent version of the data is stored in the cache, no further requests for the second more recent version of the data are received, then deleting the second more recent version of the data from the cache.

39. The computer-readable medium as recited in claim 34, further comprising one or more additional instructions which, when executed by the one or more processors, cause the one or more processors to perform the step of providing data that indicates whether the first recent version of the data was successfully deleted from the cache.

40. The computer-readable medium as recited in claim 35, further comprising one or more additional instructions which, when executed by the one or more processors, cause the one or more processors to perform the step of causing a copy of the second more recent version of the data to be stored at a second cache.

41. The computer-readable medium as recited in claim 35, wherein the step retrieving and storing in the cache the second more recent version of the data is performed in response to processing one or more requests from an authorized entity.

42. The computer-readable medium as recited in claim 34, further comprising one or more additional instructions which, when executed by the one or more processors, cause the one or more processors to perform the step of generating, based upon a set of logging criteria, log data that indicates one or more activities of the cache.

43. The computer-readable medium as recited in claim 42, wherein the set of logging criteria includes the size of the first version of data provided.

44. The computer-readable medium as recited in claim 42, wherein the set of logging criteria includes an amount of time required to provide the first version of data.

45. A computer-implemented method for managing data stored in a cache comprising:
selecting, based upon one or more selection criteria, one or more data items from a plurality of data items stored on the cache;
determining, for each of the one or more data items, independent of any request for any of the one or more data items, whether a newer version of the data item is available; and
for each of the one or more data items where a determination is made, independent of any request for any of the one or more data items, that a newer version of the data item is available,
storing, in a location other than the cache, a request to retrieve and store in the cache the newer version of the data item,
processing the request to retrieve and store in the cache the newer version of the data item,
if the request to retrieve and store in the cache the newer version of the data item cannot be processed successfully, then after expiration of a specified time,
retrieving from the location other than the cache, the request to retrieve and store in the cache the newer version of the data item,
re-processing the request to retrieve and store in the cache the newer version of the data item,
receiving the newer version of the data item;
storing in the cache the newer version of the data item; and
deleting the data item from the cache.

46. The method as recited in claim 45, wherein the one or more selection criteria include a source of each of the plurality of data items.

47. The method as recited in claim 45, wherein the one or more selection criteria include a type of each of the plurality of data items.

48. The method as recited in claim 45, wherein the one or more selection criteria include one or more users of the plurality of data items.

49. The method as recited in claim 45, wherein the one or more selection criteria include a size of each of the plurality of data items.

50. The method as recited in claim 45, wherein the one or more selection criteria include an age of each of the plurality of data items.

51. The method as recited in claim 45, further comprising:
storing a request to delete the data item from the cache,
if the request to delete the data from the cache is not successfully processed, then
processing the stored request to delete the data from the cache.

52. The method as recited in claim 45, further comprising for each of the one or more data items where a newer version of the data item is available, storing in a second cache the newer version of the data item.

53. The method as recited in claim 45, wherein the steps of deleting the data item from the cache, and retrieving and storing in the cache the newer version of the data item are preformed in response to processing one or more requests from an authorized entity.

54. A computer-readable medium carrying instructions stored therein for managing data stored in a cache, wherein execution of the instructions causes:
selecting, based upon one or more selection criteria, one or more data items from a plurality of data items stored on the cache;
determining, for each of the one or more data items, independent of any request for any of the one or more data items, whether a newer version of the data item is available; and for each of the one or more data items where a determination is made, independent of any request for any of the one or more data items, that a newer version of the data item is available,
  storing, in a location other than the cache, a request to retrieve and store in the cache the newer version of the data item,
  processing the recluest to retrieve and store in the cache the newer version of the data item,
  if the request to retrieve and store in the cache the newer version of the data item cannot be processed successfully, then after expiration of a specified time,
    retrieving from the location other than the cache, the request to retrieve and store in the cache the newer version of the data item,
      re-processing the recluest to retrieve and store in the cache the newer version of the data item,
  receiving the newer version of the data item;
  storing in the cache the newer version of the data item; and deleting the data item from the cache.

55. The computer-readable medium as recited in claim 54, wherein the one or more selection criteria include a source of each of the plurality of data items.

56. The computer-readable medium as recited in claim 54, wherein the one or more selection criteria include a type of each of the plurality of data items.

57. The computer-readable medium as recited in claim 54, wherein the one or more selection criteria include one or more users of the plurality of data items.

58. The computer-readable medium as recited in claim 54, wherein the one or more selection criteria include a size of each of the plurality of data items.

59. The computer-readable medium as recited in claim 54, wherein the one or more selection criteria include an age of each of the plurality of data items.

60. The computer-readable medium as recited in claim 54, further comprising one or more additional instructions which, when executed by the one or more processors, cause the one or more processors to perform the steps of:
  storing a request to delete the data item from the cache,
  if the request to delete the data from the cache is not successfully processed, then
    processing the stored request to delete the data from the cache.

61. The computer-readable medium as recited in claim 54, further comprising one or more additional instructions which, when executed by the one or more processors, cause the one or more processors to perform the step of for each of the one or more data items where a newer version of the data item is available,
  storing in a second cache the newer version of the data item.

62. The computer-readable medium as recited in claim 54, wherein the steps of deleting the data item from the cache, and retrieving and storing in the cache the newer version of the data item are preformed in response to processing one or more requests from an authorized entity.

63. A computer-implemented method for managing a cache comprising:
  detecting, independent of any request for data, that new data that is not stored in the cache is available;
  in response to detecting, independent of any request for data, that the new data is available,
    storing, in a location other than the cache, a recluest to retrieve and store in the cache the new data,
    Processing the request to retrieve and store in the cache the new data,
    if the recluest to retrieve and store in the cache the new data cannot be processed successfully, then after expiration of a specified time,
      retrieving from the location other than the cache, the request to retrieve and store in the cache the new data,
      re-processing the request to retrieve and store in the cache the new data,
    receiving the new data; and
    storing the new data in the cache;
  receiving from a user a request for the new data; and
  in response to receiving the request for the new data,
    retrieving the new data from the cache, and
    providing the new data to the user.

64. A computer-readable medium carrying instructions stored therein for managing a cache, wherein execution of the instructions by one or more processors causes:
  detecting, independent of any request for data, that new data that is not stored in the cache is available;
  in response to detecting, independent of any request for data, that the new data is available,
    storing, in a location other than the cache, a request to retrieve and store in the cache the new data,
    processing the request to retrieve and store in the cache the new data,
    if the request to retrieve and store in the cache the new data cannot be processed successfully, then after expiration of a specified time,
      retrieving from the location other than the cache, the request to retrieve and store in the cache the new data,
      re-processing the request to retrieve and store in the cache the new data,
    receiving the new data; and
    storing the new data in the cache;
  receiving from a user a request for the new data; and
  in response to receiving the request for the new data,
    retrieving the new data from the cache, and
    providing the new data to the user.

65. A computer-implemented method for managing content comprising:
  retrieving from an origin server a first version of content;
  storing the first version of the content on a storage medium at a traffic server;
  in response to a first request for the content, retrieving the first version of the content from the storage medium and providing the first version of the content;
  detecting, independent of any request for the content, that a second more recent version of the content is available on the origin server;
  in response to detecting, independent of any request for the content, that the second more recent version of the content is available on the origin server,
    storing, in a location other than the cache, a request to retrieve and store in the cache the second more recent version of the content,
    processing the request to retrieve and store in the cache the second more recent version of the content,
    if the request to retrieve and store in the cache the second more recent version of the content cannot be processed successfully, then after expiration of a specified time,
      retrieving from the location other than the cache, the request to retrieve and store in the cache the second more recent version of the content, re-processing the request to retrieve and store in the cache the second more recent version of the content, receiving the second more recent version of the content;

storing the second more recent version of the content on the storage medium;

deleting the first version of the content from the storage medium; and in response to a second request for the content, retrieving the second more recent version of the content from the storage medium and providing the second more recent version of the content.

66. A computer-readable medium carrying one or more sequences of one or more instructions stored therein for managing content, wherein execution of the one or more sequences of one or more instructions by one or more processors cause the one or more processors to perform the steps of:

retrieving from an origin server a first version of content;

storing the first version of the content on a storage medium at a traffic server;

in response to a first request for the content, retrieving the first version of the content from the storage medium and providing the first version of the content;

detecting, independent of any request for the content, that a second more recent version of the content is available on the origin server;

in response to detecting, independent of any request for the content, that the second more recent version of the content is available on the origin server, storing, in a location other than the cache, a request to retrieve and store in the cache the second more recent version of the content, processing the request to retrieve and store in the cache the second more recent version of the content, if the request to retrieve and store in the cache the second more recent version of the content cannot be processed successfully, then after expiration of a specified time, retrieving from the location other than the cache, the request to retrieve and store in the cache the second more recent version of the content, re-processing the request to retrieve and store in the cache the second more recent version of the content, receiving the second more recent version of the content, storing the second more recent version of the content on the storage medium;

deleting the first version of the content from the storage medium; and in response to a second request for the content, retrieving the second more recent version of the content from the storage medium and providing the second more recent version of the content.

67. An apparatus for managing content on a cache comprising:

a communications interface configured to communicate with the cache; and a differencing mechanism communicatively coupled to the communications interface and configured to detect, independent of any request for content, that a second more recent version of the content is available, in response to detecting, independent of any request for content, that the second more recent version of the content is available, store, in a location other than the cache, a request to retrieve and store in the cache the second more recent version of the content, process the request to retrieve and store in the cache the second more recent version of the content, if the request to retrieve and store in the cache the second more recent version of the content cannot be processed successfully, then after expiration of a specified time, retrieve from the location other than the cache, the request to retrieve and store in the cache the second more recent version of the content, re-process the request to retrieve and store in the cache the second more recent version of the content, receive the second more recent version of the content; and cause the second more recent version of the content to be stored on the cache.

68. The apparatus as recited in claim 67, wherein the differencing mechanism is further configured to delete from the cache a first older version of the content.

69. The apparatus as recited in claim 68, wherein the differencing mechanism is further configured to:

store a request to delete the first older version of the content from the cache, and if the request to delete the first older version of the content from the cache cannot be successfully processed, then after expiration of the specified time, retrieving the request to delete the first older version of the content from the cache, and processing the request to delete the first older version of the content from the cache.

70. The apparatus as recited in claim 67, wherein the differencing mechanism is further configured to if the second more recent version of the content cannot be retrieved and stored in the cache, then after expiration of the specified time, attempt to again retrieve and store in the cache the second more recent version of the content.

71. The apparatus as recited in claim 67, wherein the differencing mechanism is further configured to if, after expiration of the specified time from a time when the second more recent version of the content is stored in the cache, no further requests for the second more recent version of the content are received, then deleting the second more recent version of the content from the cache.

72. The apparatus as recited in claim 67, wherein the differencing mechanism is further configured to generate data that indicates whether the second more recent version of the content was successfully retrieved and stored in the cache.

73. The apparatus as recited in claim 67, wherein the differencing mechanism is further configured to cause a copy of the second more recent version of the content to be stored at a second cache.

74. The apparatus as recited in claim 67, wherein the retrieving and storing in the cache the second more recent version of the content is performed in response to processing one or more requests from an authorized entity.

75. The apparatus as recited in claim 67, wherein the differencing mechanism is further configured to generate, based upon a set of logging criteria, log data that indicates one or more activities of the cache.

76. The apparatus as recited in claim 75, wherein the set of logging criteria includes the size of the first version of content provided.

77. An apparatus for managing a cache comprising:
- a communications interface configured to communicate with the cache; and
- a differencing mechanism communicatively coupled to the communications interface and configured to
  - detect, independent of any requests for data stored in the cache, that a second more recent version of the data is available;
  - in response to detecting, independent of any requests for data stored in the cache,
    - that the second more recent version of the data is available,
    - causing a first older version of the data to be deleted from the cache,
    - storing, in a location other than the cache, a recluest to retrieve and store in the cache the second more recent version of the content,
    - processing the request to retrieve and store in the cache the second more recent version of the content,
  - if the request to retrieve and store in the cache the second more recent version of the content cannot be processed successfully, then after expiration of a specified time,
    - retrieving from the location other than the cache, the request to retrieve and store in the cache the second more recent version of the content.
    - re-processing the request to retrieve and store in the cache the second more recent version of the content; and
- receiving the second more recent version of the content.

* * * * *